United States Patent [19]

Christopherson et al.

[11] 4,014,112
[45] Mar. 29, 1977

[54] OPTICAL MOTION PICTURE FILM PRINTER

[75] Inventors: Rodger L. Christopherson, Chatsworth; George J. Sorokin, Woodlands Hills, both of Calif.

[73] Assignee: PSC Technology, Inc., Glendale, Calif.

[22] Filed: June 2, 1975

[21] Appl. No.: 582,602

[52] U.S. Cl. .................................. 355/50; 355/55; 355/90; 352/72; 352/80
[51] Int. Cl.² .......................................... G03B 27/48
[58] Field of Search ............... 355/50, 55, 51, 89, 355/90, 31; 352/79, 80, 133, 136, 72

[56] References Cited

UNITED STATES PATENTS

| | | | |
|---|---|---|---|
| 1,786,220 | 12/1930 | Owens | 355/50 |
| 1,963,480 | 6/1934 | Whitman | 355/31 |
| 2,022,362 | 11/1935 | Porter | 352/175 |
| 2,249,033 | 7/1941 | O'Grady | 355/55 |
| 2,757,572 | 8/1956 | Debrie | 352/79 |
| 3,375,055 | 3/1968 | Hughes | 352/72 |
| 3,434,783 | 3/1969 | Sakaki | 352/72 |
| 3,741,647 | 6/1973 | Harris | 355/55 |

FOREIGN PATENTS OR APPLICATIONS

| | | | |
|---|---|---|---|
| 670,007 | 4/1952 | United Kingdom | 355/50 |
| 174,622 | 6/1923 | United Kingdom | 355/50 |

Primary Examiner—Monroe H. Hayes
Attorney, Agent, or Firm—Christie, Parker & Hale

[57] ABSTRACT

An optical film printer has a projector station and a camera station each of which interchangeably receive a complete 16 mm, regular 8 mm, or super-8 mm film transport unit, including drive sprocket wheels and incremental film advance mechanism. A lens is disposed between the stations. A pair of output members of a power transmission system rotate responsive to a drive motor. Each film transport unit incrementally advances film past an aperture responsive to rotation of an input member that engages one of the output members and when received by the corresponding station. Each film transport unit advances the same number of frames per unit angular displacement of the output members. The unit at the projector station is movable toward and away from the camera station, and the lens is adjustable in three directions. The power transmission system permits each output member to be independently driven in both directions or to be driven in synchronism. The power transmission system, film drive motor, reel drive motors, and control electronics are all housed in an enclosed chassis having a top panel on which the reels and the film transport units are all mounted.

18 Claims, 10 Drawing Figures

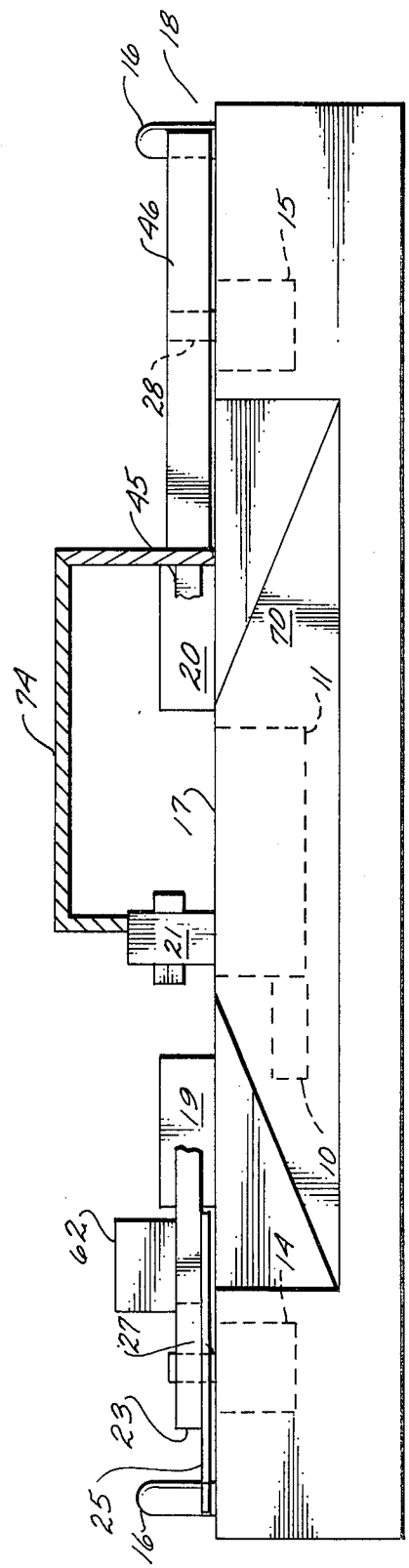

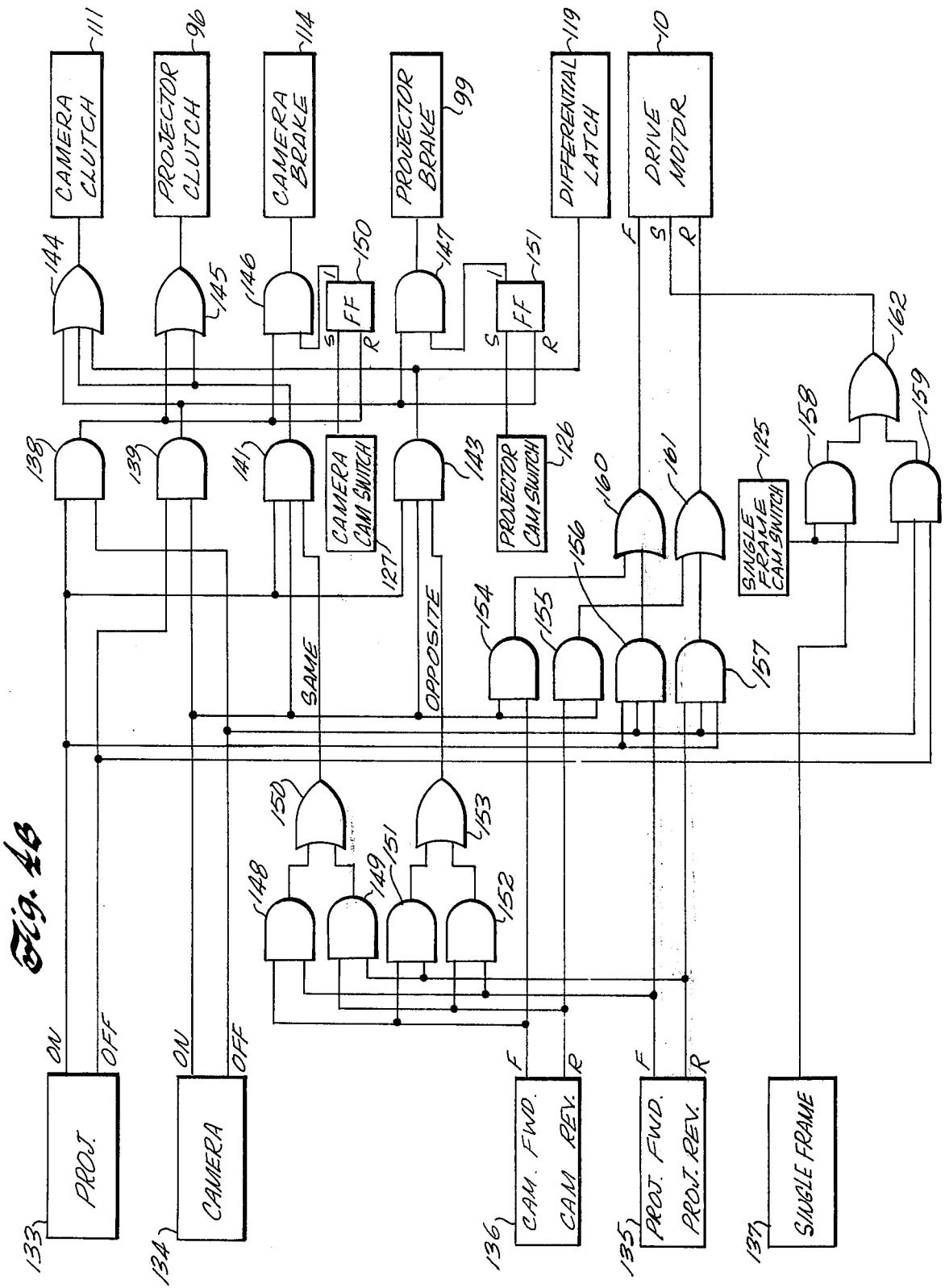

OPTICAL MOTION PICTURE FILM PRINTER

BACKGROUND OF THE INVENTION

This invention relates to motion picture film printers and, more particularly, to an optical film printer capable of handling different motion picture film formats.

Optical film printers are employed to expose a roll of raw film incrementally transported past an exposure aperture at a camera station to the photographic images on a roll of master film incrementally transported in synchronism with the raw film past a projection aperture at a projector station. a lamp directs light through each frame of the master film in turn and through a lens onto the raw film during the dwell period between transporting increments. After exposure of the raw film to the entire master film in this manner, the raw film is developed to produce a copy of the master film.

There are a number of different motion picture film formats, including 16 mm, regular 8 mm, and super-8 mm. Each such film format has a unique sprocket hole pattern, film width, and frame size. Thus, separate film transport components must be employed to handle motion picture film having different formats. In some prior art printers, the drive sprocket wheels and incremental film advance mechanism are individually replaced, when the film format of the film is changed. In other prior art printers, the entire projector and/or camera, including film drive motor are replaced, when the film format of the film is changed.

SUMMARY OF THE INVENTION

According to one feature of the invention, an optical motion picture film printer has a projector station and a camera station on its chassis, each of which removably receives any one of a plurality of interchangeable film transport units that handle different film formats. Each film transport unit, which includes drive sprocket wheels and an incremental film advance mechanism, is secured at its respective station by quick disconnect fastening means. The drive sprocket wheels and incremental film advance mechanism of each film transport unit advance film past an aperture responsive to rotation of a single input member. A power transmission system housed in the chassis has output members that rotate responsive to a drive motor housed in the chassis. The output members each engage the single input member of one of the film transport units, when such unit is received by the projector station or camera station to advance the film as the drive motor rotates. To handle film having a different format, the entire film transport unit at the projector station and/or the camera station is simply replaced with a new film transport unit having suitable drive sprocket wheels and incremental film transport mechanisms for such film format.

According to another feature of the invention, the power transmission system, film drive motor, reel drive motors, and control electronics of an optical motion picture film printer are all housed in an enclosed chassis having a horizontal top panel on which the reels of master film, the reels of raw film, and the tape transport units are all mounted. As a result, the master film and raw film are both transported in a horizontal plane spaced directly above the top panel of the chassis. Hubs passing through the top panel interconnect the reels on the panel to the reel drive motors housed in the chassis. Exposed gears connect the film transport units on the top panel to the power transmission system housed in the chassis.

BRIEF DESCRIPTION OF THE DRAWINGS

The features of a specific embodiment of the best mode contemplated of carrying out the invention are illustrated in the drawings, in which:

FIGS. 1B and 1C are top plan and side elevation views, respectively, of the chassis of the printer with the components thereof schematically illustrated;

FIGS. 4A and 4B are mechanical and electrical schematic diagrams, respectively, of the power transmission system and its control from the control panel of the printer.

DETAILED DESCRIPTION OF THE SPECIFIC EMBODIMENT

Figure 1A:
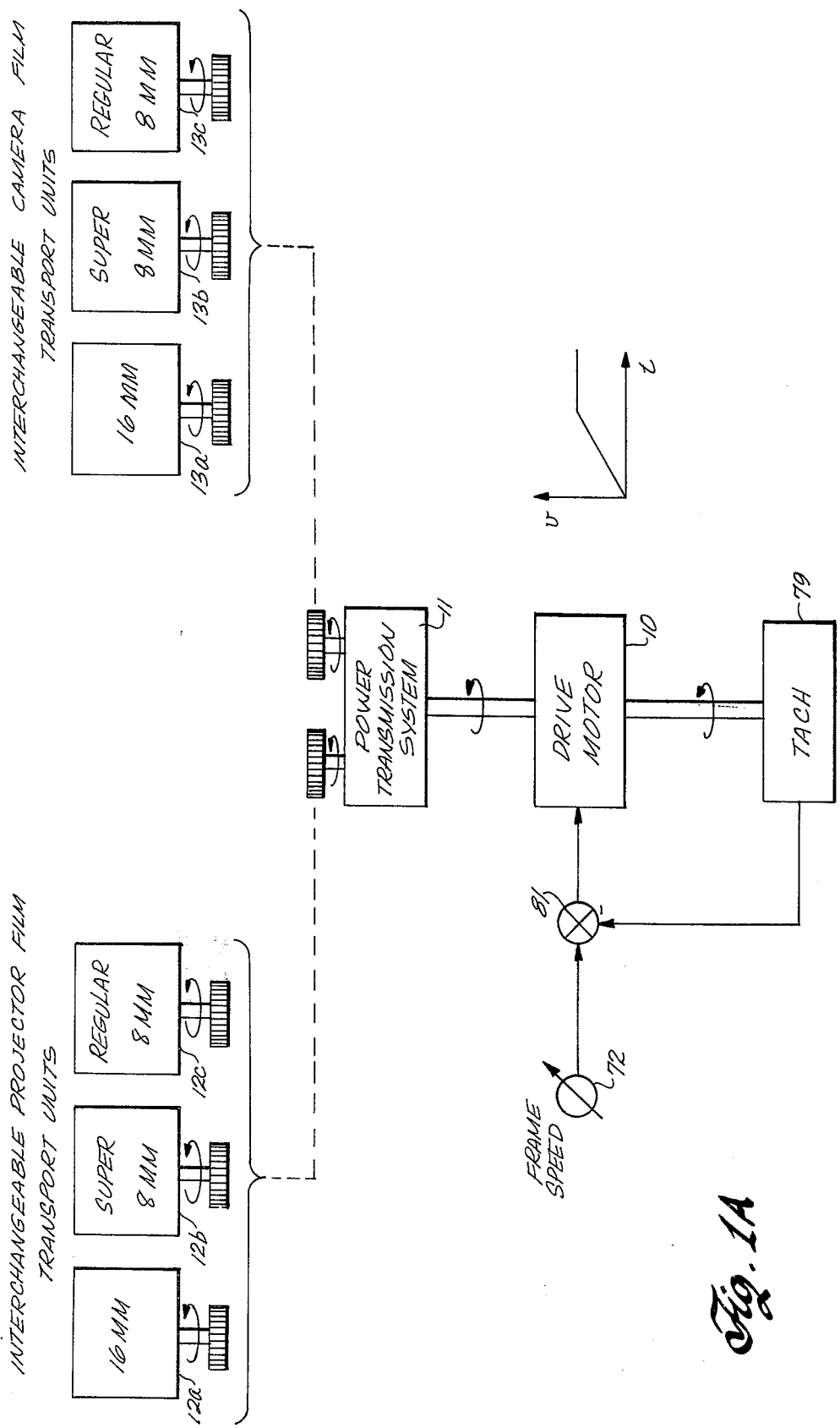
FIG. 1A is a block diagram of the film transporting components of an optical motion picture printer embodying the principles of the invention.

In FIG. 1, a drive motor 10 of an optical motion picture film printer is coupled by a power transmission system 11 to one of three interchangeable projector film transport units 12a, 12b, and 12c designed to handle 16 mm, super-8 mm, and regular 8 mm film formats, respectively, and to one of three interchangeable camera film transport units 13a, 13b, and 13c designed to handle 16 mm, super-8 mm, and regular 8 mm film formats, respectively. Each projector film transport unit has a projection aperture, an incremental film advance mechanism for drawing the film past the aperture, a pair of film drive sprocket wheels or capstans in the film path on opposite sides of the projection aperture, and a single input gear that operates both the film advance mechanism and the drive sprocket wheels at it rotates. The camera film transport units are the same as the projector film transport units with the addition of a shutter synchronized to the film advance mechanism, so the raw film is only exposed during the dwell periods between film transporting increments. The input gears of the film transport units engage output gears of power transmission system 11. Each film transport unit is designed to advance the film it handles one frame for each revolution of the output gears, irrespective of the film format. The internal gearing and linkages in the individual film transport units are designed to rotate the drive sprockets wheels and the film advance mechanism accordingly. Film transport units 12a, 12b, 12c, 13a, 13b, and 13c could be commercially available transport units such as Bell and Howell Part No. 014544 modified to provide the desired projector and camera functions and the gearing and linkages to advance the film one frame for each revolution of the input gear for each film format. The velocity vs. time characteristics of motor 10 are illustrated by the graph adjacent to motor 10; when motor 10 is turned on, its velocity rises linearly as a function of time until it reaches operating velocity, i.e., its acceleration is constant. This prevents the exertion of great tension on the film during start up, which could cause film damage.

Figure 1B:
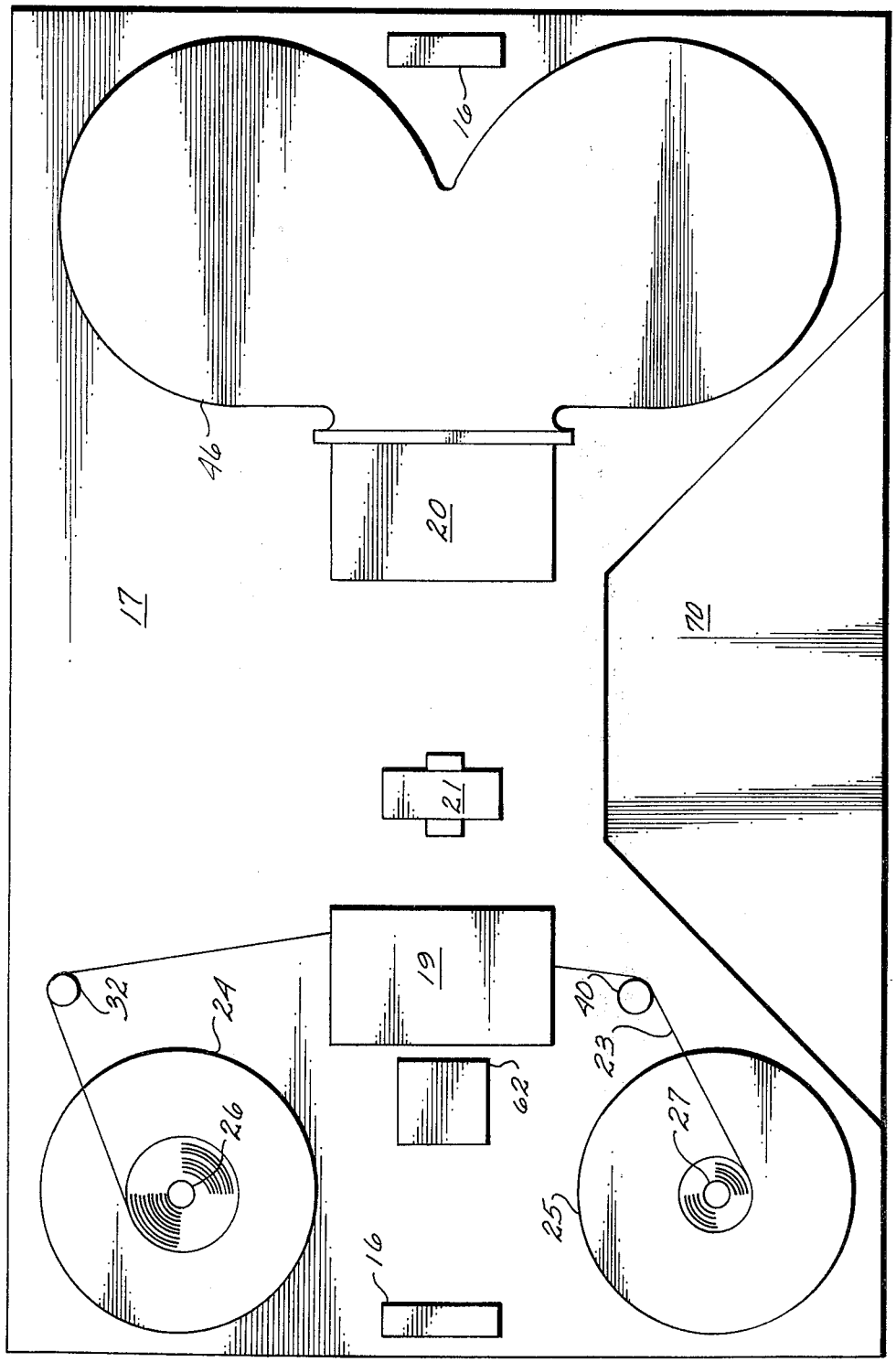

As illustrated in FIGS. 1B and 1C, an enclosed chassis 18 has a horizontal top panel 17 on which a projector station 19, including a film transport unit, and a camera station 20, including a film transport, are located. A lens mounting assembly 21 is mounted on top panel 17 between stations 19 and 20. A master film 23, having images to be projected to camera station 20, is stored on reels 24 and 25 which lie directly over top panel 17. Film 23 is directed between reels 23 and 24 and projector station 19 by guide rollers 32 and 40. Thus, film 23 is transported along a film path directly above top panel 17. Reels 24 and 25 are mounted on hubs 26 and 27, respectively, which extend through top panel 17 to conventional constant-torque reel drive motors housed within enclosed chassis 18. One of these reel drive motors is indicated at 14 in FIG. 1C. A lamp housing 62 is aligned with projector station 19, camera station 20, and lens mounting assembly 21 on the side of projector station 19 opposite from lens mounting assembly 21. A raw film 45 is stored on a pair of reels inside a conventional light-tight cartridge 46. The reels of cartridge 46 are mounted on hubs that extend through top panel 17 to conventional constant-torque reel drive motors housed within enclosed chassis 18. One of these hubs is designated 28 and one of these reels drive motors is designated 15 in FIG. 1C. Film 45 is directed between cartridge 46 and camera station 20 along a film transport path lying in a horizontal plane directly above top panel 17. Preferably, reels 24 and 25 and cartridge 46 as well as the other components mounted on top panel 17 lie completely within the confines of the area of top panel 17 as illustrated in FIG. 1B. A removable light-tight cover 74 encloses station 20 so that the printer may be operated in a daylight environment. As depicted in FIG. 1C, film drive motor 10 and power transmission system 11 are also housed within enclosed chassis 18. Handles 16 for lifting the printer are located on the ends of top panel 17. A canted control panel 70, discussed in more detail below, slopes from top panel 17 to the front side of chassis 18.

Figure 2:
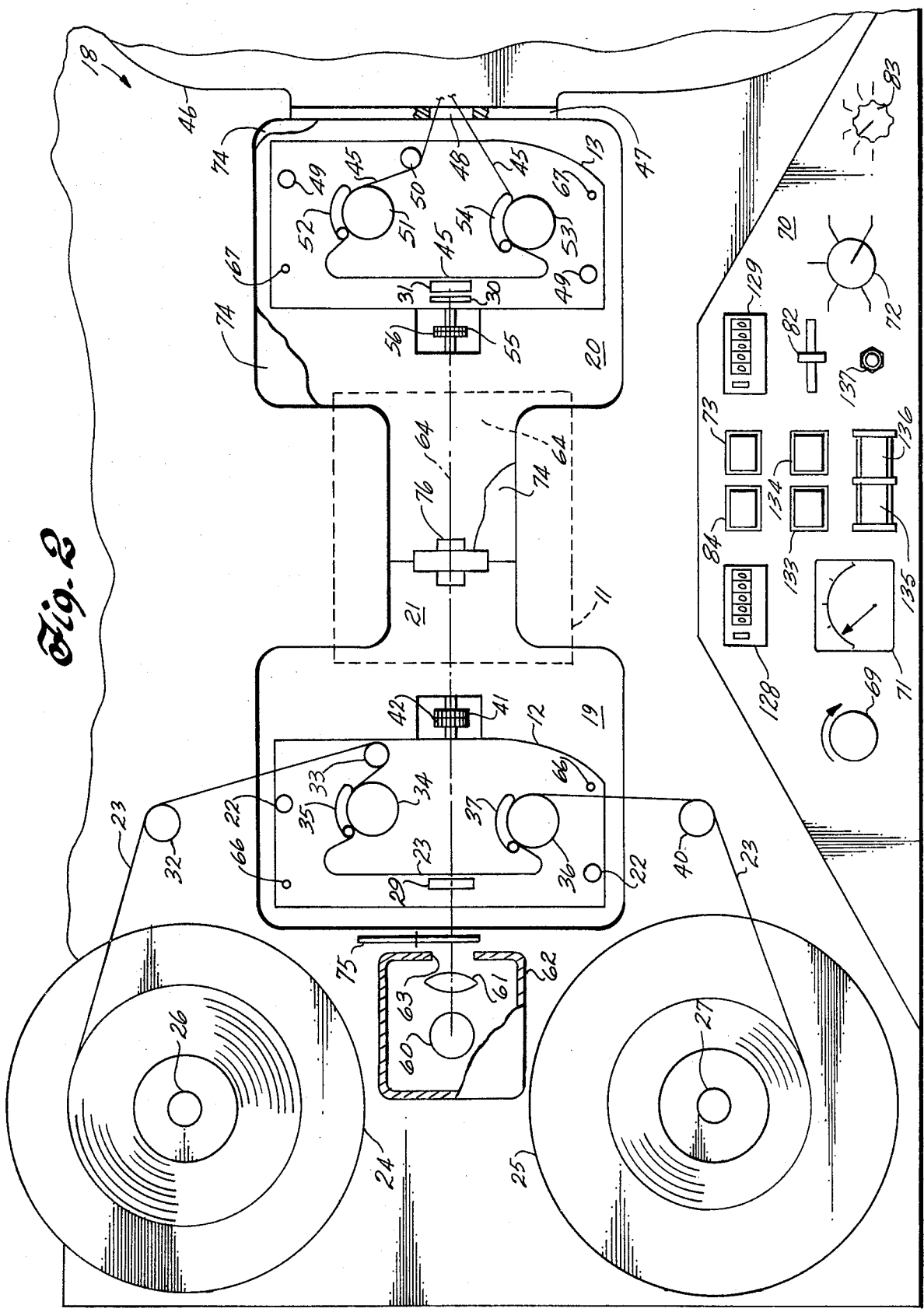
FIG. 2 is a top plan view of the chassis with the components illustrated in detail.

Reference is made to FIG. 2 for a detailed description of top panel 17. Station 19 removably receives a projector film transport unit 12, which would be one of the interchangeable projector film transport units shown in FIG. 1. Film transport unit 12 is secured to a slidable carriage, described below in connection with FIGS. 3A and 3B, by quick disconnect fasteners in the form of screws 22. Station 19 is recessed below the surface of top panel 17 sufficiently to align unit 12 with reels 24 and 25 so the path of film 23 lies in a single plane directly above top panel 17. Film 23 extends from reel 24 across a guide roller 32 on the top of chassis 18, to a guide roller 33 on unit 12. From guide roller 33, film 23 extends between a drive sprocket wheel or capstan 34 and a pivotable spring loaded film guard 35 that retains the sprocket holes of film 23 in engagement with the teeth of sprocket wheel 34. Film 23 forms between sprocket wheel 34 and a drive sprocket wheel or capstan 36 a loop that passes a projection aperture, not shown, and an incremental film advance mechanism 29. The sprocket holes of film 23 are retained in engagement with the teeth of sprocket wheel 36 by a pivotable spring biased film guard 37. From sprocket wheel 36, film 23 extends across a guide roller 40 on the top of chassis 18 to reel 25. Power transmission system 11 has an output gear 41 that lies under and engages an input gear 42 of unit 12.

When cartridge 46 is mounted on chassis 18, its film exit abuts a vertical film entrance plate 47 with an opening 48 through which the film passes into camera station 20. A camera film transport unit 13, which would be one of the interchangeable camera film transport units shown in FIG. 1, is removably received by station 20. Film transport unit 13 is secured to a stationary portion of chassis 18 by quick disconnect fasteners in the form of screws 49. Station 20 is recessed below the surface of top panel 17 sufficiently to align unit 12 with cartridge 46 so the path of film 45 lies in a single plane directly above top panel 17. Raw film 45 extends across a guide roller 50 on unit 13 to drive sprocket wheel or capstan 51. The sprocket holes of film 45 are held in engagement with the teeth of sprocket wheel 51 by a pivotable spring loaded film guard 52. Between sprocket wheel 51 and a drive sprocket wheel or capstan 53, film 45 forms a loop that passes an exposure aperture, not shown, a shutter 30, and an incremental film advance mechanism 31. The shutter operation is synchronized to the movement of the film advance mechanism in known fashion. A pivotable spring loaded film guard 54 holds the sprocket holes of film 45 in engagement with the teeth of sprocket wheel 53. From sprocket wheel 53, film 45 returns to cartridge 46 through opening 48. Unit 13 has an input gear 55 that engages an underlying output gear 56 of power transmission system 11.

A lamp 60 and a condenser 61 are enclose in a housing 62. Lamp 60 is turned on by depressing a lamp button 73 on control panel 70. The intensity of the light emitted from lamp 60 is adjusted by turning a knob 69 on a control panel 70. As knob 60 is turned, the current passing through lamp 60 and, thus, the light intensity is indicated by a meter 71 on control panel 70. Light from lamp 60 collected by condenser 61 is projected through an opening 63 in housing 62 along a path designated 64, which passes through a fader disc 75, film 23 at the projection aperture, and a lens 76 supported by lens mounting assembly 21 onto film 45 at the exposure aperture. As a result, the image of each frame of film 23 in turn is projected onto film 45 when the shutter opens to exposure its surface. A removable light-tight cover 74, which extends longitudinally from lens mounting assembly 21 to plate 47, encloses station 20 including unit 13. Thus, the printer may be operated in a normally lighted room. After exposure of film 45, it is developed to produce a copy of master film 23. To fade in or out a scene being copied, a dissolve lever 82 on control panel 70 is moved to the right or to the left, respectively. A dissolve knob 83 on control panel 70 is turned to set the number of frames over which the fade is to take place.

Input gear 42 is coupled by appropriate gearing and linkages to capstans 34 and 36 and the incremental film advance mechanism of unit 12 to transport film past the projection aperture. Similarly, input gear 55 is coupled by appropriate gearing and linkages to capstans 51 and 53, the incremental film advance mechanism, and the shutter of unit 13 to transport film 45 past the exposure aperture and expose film 45 to the light projected by lamp 60 during each dwell period of the incremental film advance. The gearing and linkages of units 12 and 13 are designed to advance the master film and the raw film one frame of the particular film format for each revolution of output gears 41 and 56.

To replace unit 12 with a film transport unit for a different film format, screws 22 are loosened and unit 12 is lifted off station 19. Since input gear 42 lies above output gear 41, it is free to move with unit 12 and thus disengages itself from gear 41. Each unit has indexing holes 66 into which pins at station 19 fit when the unit is properly positioned at station 19. The new unit is lowered onto station 19 so the pins thereon fit into its indexing holes 66. This brings the input gear of the new unit into engagement with output gear 41. Screws 22 are then tightened to secure the unit on station 19. The gearing and linkages of the new unit are also designed to advance the master film one frame for each complete revolution of output gear 41.

Figure 3A:
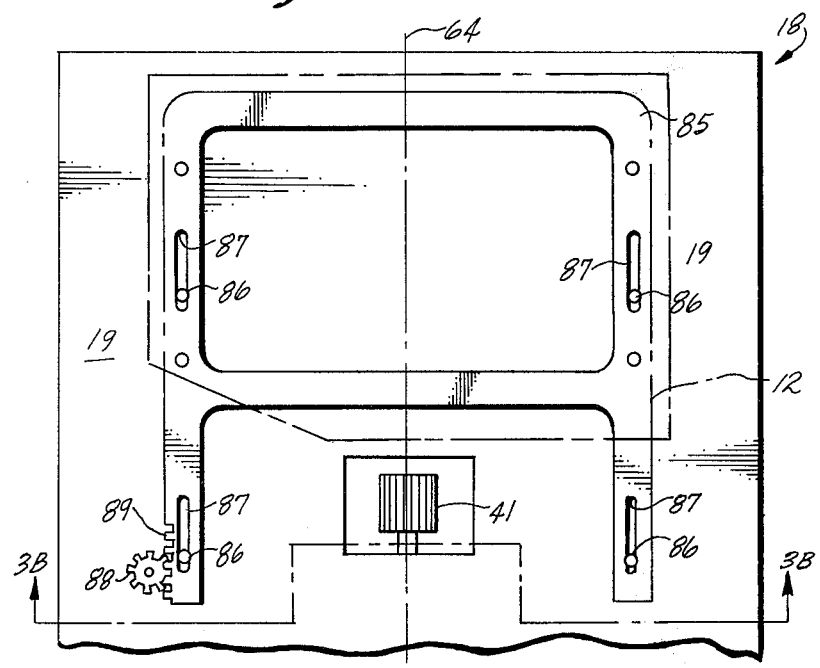
FIGS. 3A and 3B are top plan and side sectional views, respectively, of a movable carriage for receiving a film transport unit at the projector station of the printer.
Figure 3B:
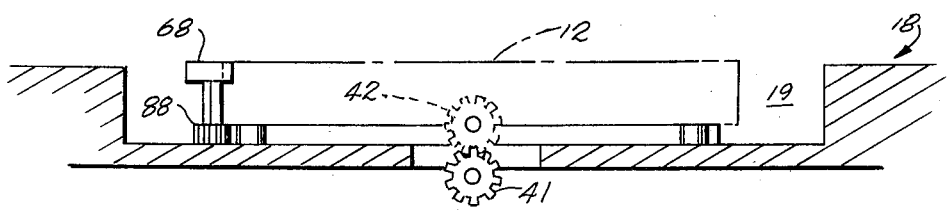

Similarly, to replace unit 13, screws 49 are loosened and unit 13 is lifted off station 20, thereby disengaging input gear 55 from output gear 56. Each unit has indexing holes 67 spaced differently from indexing holes 66 to prevent an inadvertant switch of projector and camera units. Holes 67 fit into pins at station 20 when the unit is properly positioned at station 20. The new unit is lowered onto station 20 so that the pins thereon fit into its indexing holes 67. This brings the input gear of the new unit into engagement with output gear 56. When the frame size of the master film or the copy film changes, it is desirable to change the distance between the projection aperture at station 19 and the exposure aperture at station 20. This is achieved by turning a knob 68 to translate a carriage 85, on which unit 12 is mounted, parallel to light projection path 64. As illustrated in FIGS. 3A and 3B, carriage 85 is disposed on the top of chassis 18 at projection station 19. Posts 86, which are fixed to the top of chassis 18, ride in slots 87 of carriage 85. A pinion 88 is coupled to knob 68. A rack 89 formed in the side of carriage 85 engages pinion 88. As knob 68 is turned, its motion is transmitted to rack 89 and pinion 88, to translate carriage 85 parallel to light projection path 64. The outline of unit 12 is depicted in FIGS. 3A and 3B by phantom lines. Output gear 41 is sufficiently wider than input gear 42 to maintain input gear 42 in engagement therewith as the projection film transport unit is translated parallel to light path 64.

Power to the printer is turned on by depressing a power button 84 on control panel 70. The film transport speed in frames per minute is adjusted by turning a knob 72 on control panel 70 (FIG. 2). Knob 72 controls the angular velocity of motor 10 and, consequently, the angular velocity of output gears 41 and 56 of power transmission system 11. As a result, since each of the projector and camera film transport units is designed to advance the film in the format it handles one frame for each revolution of output gears 41 and 56, variation of the angular velocity of drive motor 10 in this manner provides the same change in frame speed irrespective of the format of the master film and the raw film. As illustrated in FIG. 1, drive motor 10, which is a D.C. motor, is part of a linear velocity servo loop. Thus, when drive motor 10 is turned on its angular velocity rises linearly to the operating velocity selected by knob 72, and when drive motor 10 is turned off its angular velocity drops linearly to zero. A tachometer 79 coupled to drive motor 10 generates a feedback signal proportional to its angular velocity. The magnitude of a reference signal generated by a network 80 is dependent upon the position of frame speed knob 72. Network 80 could be a voltage divider circuit into which a different resistance is switched for each position of knob 72. The outputs of network 80 and tachometer 79 are applied to a summing junction 81 where one is subtracted from the other to form an error signal that actuates drive motor 10. Each time knob 72 is turned to a different position the value of the reference signal produced by network 80 changes, thereby shifting the angular velocity of drive motor 10 to the designated frame speed.

Figure 4A:
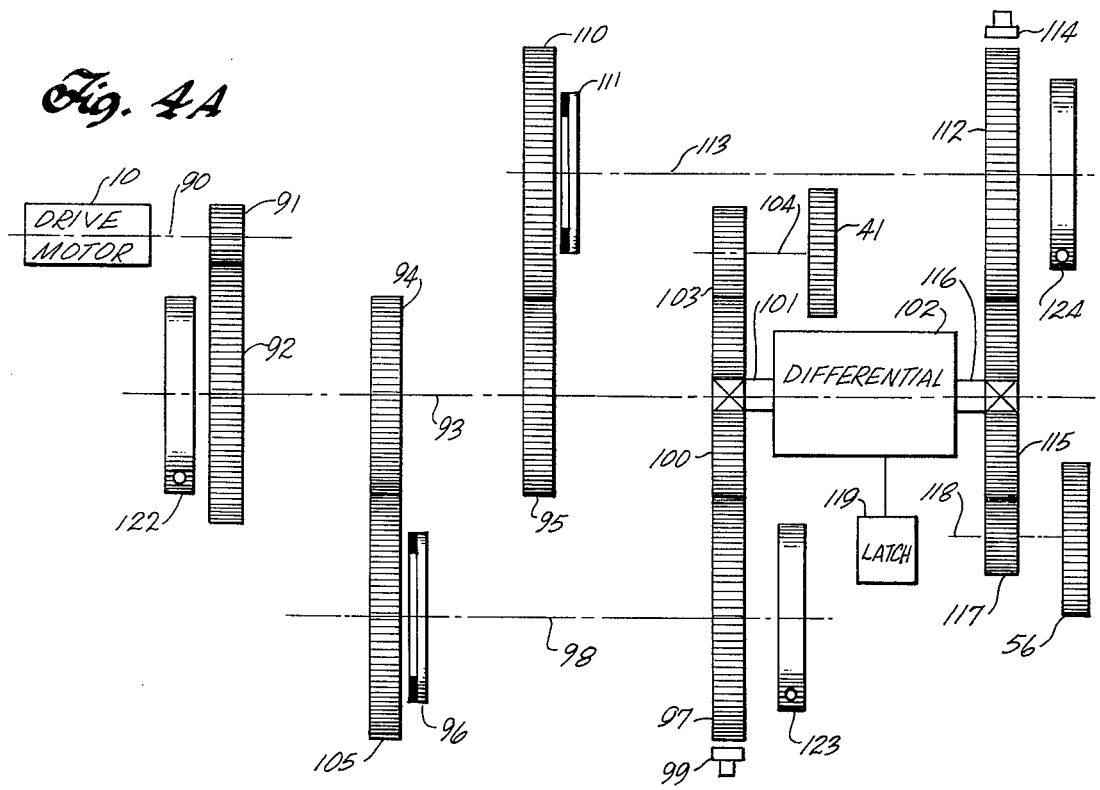

Reference is made to FIG. 4A for a description of power transmission system 11. Drive motor 10 is coupled by a shaft 90 to a gear 91. A gear 92 mounted on a shaft 93 engages gear 91. Gears 94 and 95 are also mounted on shaft 93. Gear 94 engages a gear 105. A clutch 96 and a gear 97 are mounted on a shaft 98. Rotation of gear 105 is coupled by clutch 96 when engaged to gear 97, which has a brake 99. Gear 97 engages a gear 100 mounted on a shaft 101 of a differential 102. Gear 100 engages a gear 103 mounted on a shaft 104. Output gear 41 is also mounted on shaft 104 to transmit the rotation of gear 103 to input gear 42 of unit 12. Gear 95 engages a gear 110. A clutch 111 and a gear 112 are mounted on a shaft 113. The rotation of gear 110 is coupled by clutch 111 when engaged to gear 112, which has a brake 114. A gear 115 mounted on a shaft 116 of differential 102 engages gear 112. A gear 117 mounted on a shaft 118 engages gear 115. Output gear 56 is also mounted on shaft 118 to transmit the rotation of gear 117 to input gear 55 of unit 13. Differential 102 has a latch 119. When latch 119 is engaged, shafts 101 and 116 are locked together to rotate in opposite directions. When latch 119 is not engaged, shafts 101 and 116 are free to rotate independently of each other. By way of example, differential 102 could be Part No. 07604-P31625-0299 of Insco Corporation, Groton, Mass.

Cam wheels 122, 123, and 124 are mounted, respectively, on shafts 93, 98, and 113 for the purpose of synchronizing the operation of units 12 and 13. Synchronization requires that each of output gears 41 and 56 end and begin at the same angular position every time drive motor 10 stops and starts. Associated with cam wheels 122, 123, and 124, respectively, are cam switches 125, 126, and 127, discussed below in connection with FIG. 4B. Single frame cam wheel 122 and switch 125 serve to control operation of the printer when unit 12 and/or unit 13 is to transport a single frame of film, and serve to synchronize units 12 and 13 when they operate concurrently. Each time cam 122 rotates through one complete revolution, single frame cam switch 125 generates an impulse. Projector cam wheel 123 and switch 126 sserve to actuate a projector frame counter 128 on control panel 70, and serve to synchronize units 12 and 13 and when unit 13 is operating without unit 12. Each time cam wheel 123 rotates one complete revolution, projector cam switch 126 generates an impulse. Camera cam wheel 124 and switch 127 serve to actuate a camera frame counter 129 on control panel 70, and serve to synchronize units 12 and 13 when unit 12 is operating without unit 13. Cam wheels 122, 123, and 124 are positioned, i.e., referenced, on their respective shafts so switches 125, 126, and 127 generate impulses simultaneously when units 12 and 13 are operating concurrently.

Reference is made to FIG. 4B for a description of electrical circuitry for controlling drive motor 10 and power transmission system 11 responsive to mode selection buttons on control panel 70, namely, a projector ON/OFF button 133, a camera ON/OFF button 134, a projector forward/reverse button 135, a camera forward/reverse button 136, and a single frame film advance button 137. ON/OFF buttons 133 and 134 each have an ON output lead and an OFF output lead that are alternately energized on successive depressions thereof. Forward/reverse buttons 135 and 136 each have an F output and an R output that are alternately energized on successive depressions thereof. Single frame film advance button 137 has an output that is alternately energized and deenergized on successive depressions thereof. The ON output of button 133 and the OFF output of button 134 are connected to the inputs of an AND gate 138. The OFF output of button 133 and the ON output of button 134 are connected to the inputs of an AND gate 139. The ON outputs of buttons 133 and 134 are connected to inputs of an AND gate 141. The ON outputs of buttons 133 and 134 are also connected to the inputs of an AND gate 143. The outputs of AND gates 139, 141, and 143 are coupled by an OR gate 144 to camera clutch 111. The outputs of AND gates 138 and 141 are coupled by an OR gate 145 to projector clutch 96. The outputs of AND gate 138 and camera cam switch 127 are connected to the R and S inputs, respectively, of an R-S flip-flop 150. The 1 output of flip-flop 150 and the output of AND gate 138 are connected to the inputs of AND gate 146, the output of which is coupled to camera brake 114. The outputs of AND gate 139 and projector cam switch 126 are connected to the R and S inputs, respectively, of an R-S flip-flop 151 The 1 output of flip-flop 151 and the output of AND gate 139 are connected to the inputs of an AND gate 147, the output of which is coupled to projector brake 99. Flip-flops 150 and 151 are arranged to reset when AND gates 138 and 139, respectively, become deenergized. The output of AND gate 143 is coupled to differential latch 119.

The F output of button 135 and the F output of button 136 are connected to the inputs of an AND gate 148. The R output of button 135 and the R output of button 136 are connected to the inputs of an AND gate 149. The outputs of AND gates 148 and 149 are coupled by an OR at 150 to one input of AND gate 141. The F output of button 135 and the R output of button 136 are connected to the inputs of an AND gate 151. The R output of button 135 and the F output of button 136 are connected to the inputs of an AND gate 152. The outputs of AND gates 151 and 152 are coupled by an OR gate 153 to one input of AND gate 143.

The ON output of button 143 is connected to one input of each of AND gates 154 and 155. The F output of button 136 is connected to the other input of AND gate 154, and the R output of button 136 is connected to the other input of AND gate 155. The ON output of button 133 and the OFF output of button 134 are connected to inputs of each of AND gates 156 and 157. The F output of button 135 is connected to the remaining input of AND gate 156, and the R output of button 135 is connected to the remaining input of AND gate 157. The output of one frame cam switch 125 and the output of button 137 are connected to the inputs of an AND gate 158. The output of one frame cam switch 125 and the OFF outputs of each of buttons 133 and 134 are connected to the inputs of an AND gate 159. When an F lead gate 159. drive motor 10 is energized, its angular velocity rises linearly in the forward direction from zero to its operating velocity, as determined by the setting of knob 72. When an R lead of drive motor 10 is energized, its velocity rises linearly in the reverse direction from zero to its operating velocity, as determined by the setting of knob 72. When an S lead of drive motor 10 is energized, its velocity decreases linearly from the operating velocity determined by the setting of knob 72 to zero. The outputs of AND gates 154 and 156 are coupled by an OR gate 160 to F lead of drive motor 10. The outputs of AND gates 155 and 157 are coupled by an OR gate 161 to the R lead of drive motor 10. The outputs of AND gates 158 and 159 are coupled by an OR gate 162 to the S lead of drive motor 10.

The described electrical circuitry controls power transmission system 11 so each of units 12 and 13 can individually transport film in either direction while the other unit is at rest, or so units 12 and 13 can both transport film concurrently, either in the same direction or in opposite directions. In any case, synchronism is maintained between the operation of units 12 and 13 when they do transport film concurrently, irrespective of prior individual operation of one unit or the other.

If unit 13 is to be individually operated while unit 12 is at rest, first button 136 is first depressed to energize the F output for transport in the forward direction or the R output for transport in the reverse direction. Then button 134 is depressed to energize the output of AND gate 154 or 155 and drive motor 10 begins to rotate in the forward or reverse direction depending upon the state of button 136. When button 134 is depressed, the output of AND gate 139 is also energized to engage camera clutch 111 and to ready projector brake 99 for engagement. The rotation of motor 10 is coupled through shaft 90, gears 91 and 92, shaft 93, gears 95 and 110, engaged camera clutch 111, shaft 113, gears 112, 115, and 117, and shaft 118 to output gear 56. To insure that unit 12 will be synchronized with unit 12 when they are later operated concurrently, projector brake 99 does not become engaged until cam wheel 123 rotates to its reference position, where projector cam switch 126 generates an impulse. This impulse sets flip-flop 150 through AND gate 147 engages projector brake 99. Until projector brake 99 is engaged, the rotation of shaft 116 is transmitted in part through differential 102 to shaft 101 so as to rotate cam wheel 123 to its reference position. Once it assumes its reference position and brake 99 becomes engaged, the position of gear 97 and thus the position of output gear 41 remain fixed until projector brake 99 is released by reset of flip-flop 151.

If unit 12 is to be individually operated while unit 13 is at first, button 135 is first depressed to energize the F output for transport in the forward direction or the R output for transport in the reverse direction. Then, button 133 is depressed to energize the output of AND gate 156 or 157 and drive motor 10 begins to rotate in the forward or reverse direction, depending upon the state of button 135. When button 133 is depressed, the output of AND gate 138 is also energized to engage projector clutch 96 and to ready camera brake 114 for engagement. The rotation of motor 10 is coupled through shaft 90, gears 91 and 92, shaft 93, gears 94 and 105, engaged projector clutch 96, shaft 98, gears 97, 100, and 103, and shaft 104 to output gear 41. To insure that unit 13 will be synchronized with unit 12 when they are later operated concurrently, camera brake 114 does not become engaged until cam wheel 124 rotates to its reference position where camera cam switch 127 generates an inpulse. This impulse sets flip-flop 150 and through AND gate 146 engages camera brake 114. Until camera brake 114 is engaged, the rotation of shaft 101 is transmitted in part through differential 102 to shaft 116 so as to rotate cam wheel 124 to its reference position. Once cam wheel 124 assumes its reference position and brake 114 becomes engaged, the position of gear 112 and, thus, the position of output gear 56 remain fixed until camera brake 114 is released by reset of flip-flop 150.

If units 12 and 13 are to be operated concurrently in the same direction, buttons 135 and 136 are first depressed to energize their F outputs for transport in the forward direction, or their R outputs for transport in the reverse direction. The output of OR gate 150 is energized when buttons 135 and 136 are set for film transport in the same direction. Then, buttons 133 and 134 are depressed to energize the output of AND gate 154 or 155 and drive motor 10 begins to rotate in the forward or reverse direction, depending upon the state of buttons 135 and 136. When buttons 133 and 134 are depressed, the output of AND gate 141 is energized to engage camera clutch 111 and projector clutch 96. The rotation of motor 10 is coupled through shaft 90, gears 91 and 91, shaft 93, gears 95 and 110, engaged clutch 111, shaft 113, gears 112, 115, and 117, and shaft 118 to output gear 56. The rotation of motor 10 is also coupled through shaft 90, gears 91 and 92, shaft 93, gears 94 and 105, engaged clutch 96, shaft 98, gears 97, 100, and 103, and shaft 104 to output gear 41, to rotate gear 41 in the same direction as output gear 56, either forward or reverse.

If units 12 and 13 are to be operated concurrently in opposite directions, buttons 135 and 136 are first depressed to energize their F outputs for transport in the forward direction or their R outputs for transport in the reverse direction. The output of OR gate 153 is energized when buttons 135 and 136 are set for film transport in opposite directions. Then, buttons 133 and 134 are depressed to energize the output of AND ate 154 or 155 and drive motor 10 begins to rotate in the forward or reverse direction depending upon the setting of button 136. When button 134 is depressed, the output of AND gate 1423 is also energized to engage camera clutch 111 and differential latch 119. The rotation of motor 10 is coupled through shaft 90, gears 91 and 91, shaft 93, gears 95 and 110, engaged clutch 111, shaft 113, gears 112, 115, and 117, and shaft 118 to output gear 56. The rotation of gear 115 is also coupled through shaft 116 and latched differential 102 to shaft 101 with a change in direction to rotate output gear 41 in the opposite direction from output gear 56.

In the normal mode of operation of the printer, drive motor 10 continues to rotate after one of buttons 133 and 134 is depressed to energize its ON output until this button is again depressed to energize its OFF output. When the OFF output of this button is energized, drive motor 10 does not stop until an impulse is generated by one frame cam switch 125. This impulse is transmitted through AND gate 159 and OR gate 162 to the S input of drive motor 10. Thus, shaft 93 and the output gear (41 or 56) being rotated by drive motor 10 always stop at its reference position. Thus, since the unit at rest is brought to and maintained at its reference position by its corresponding brake, both units will be in synchronism with each other when they are later operated concurrently. Similarly, after each concurrent operation of units 12 and 13, output gears 41 and 56 always stop at their reference positions by virtue of the pulse generated by one frame cam switch 125 to stop drive motor 10.

In a special mode of operation, drive motor 10 rotates to advance the film at unit 12 and/or unit 13 only one frame and then stops. To initiate this mode of operation, one frame button 137 is depressed, button 135 and/or button 136 are depressed to establish the direction of film transport, and then button 135 and/or button 134 are depressed to determine which unit or units are to transport one frame of film. After drive motor 10 rotates one frame cam wheel 122 one complete revolution, switch 125 generates an inpulse that is transmitted through AND gate 158 and OR gate 162 to stop drive motor 10.

Before each operation of the printer after a period of non-use, one frame film transport button 137 and projector ON/OFF button 133 are depressed to insure that output gear 456 is in its reference position, and one frame film transport button 137 and camera ON/OFF button 134 are depressed to insure that output gear 41 is in its reference position. When a projector or camera film transport unit 12 and 13 is interchanged, the input gear of the new unit is aligned with a synchronizing mark on its housing to insure correct synchronization with the output gear of power transmission system 11 it engages.

Figure 5A:
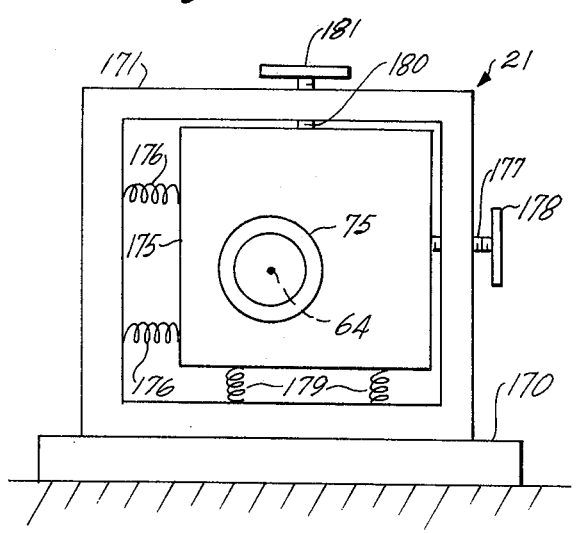
FIGS. 5A and 5B are side and front elevation views, respectively, of the lens mounting assembly of the printer.
Figure 5B:
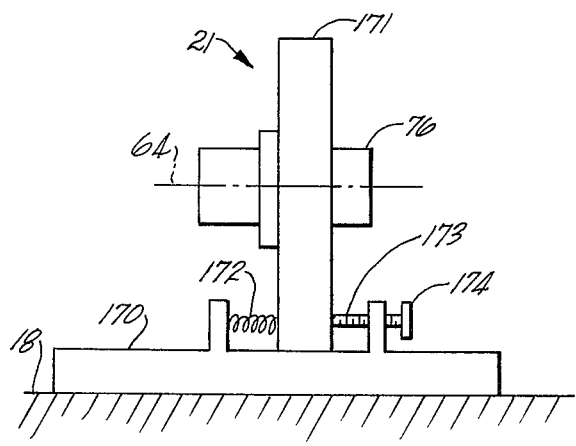

Reference is made to FIGS. 5A and 5B for a description of lens mounting assembly 21. A stationary base 170 is secured to the top surface of chassis 18. A frame 171 rides on rails (not shown) back and forth parallel to light projection path 64. A compression spring 172 lies between a projection from base 170 and one side of frame 171, and a threaded shaft 173 lies between a projection from base 170 and the other side of frame 171. To adjust the position of frame 171 and thus lens 76 longitudinally of path 64, a knob 174 at the end of shaft 173 is rotated. A lens mounting block 175, which holds lens 76, is supported within frame 171 by rails or other means so as to be translatable along two axes mutually perpendicular to light projection path 64. Compression springs 176 are disposed between frame 171 and one side of block 175 and a threaded shaft 177 is disposed between the opposite side of block 175 and frame 171. To translate lens 76 in a horizontal direction laterally of path 64, a knob 178 at the end of shaft 177 is rotated. Compression springs 179 are disposed between one side of block 175 and frame 171 and a threaded shaft 180 is disposed between the opposite side of block 175 and frame 171. To translate lens 76 in a vertical direction laterally of path 64, a knob 181 at the end of shaft 180 is turned. Thus, by turning knobs 174, 178, and 181, the position of lens 76 can be readjusted for different film formats as film transport units 12 and 13 are interchanged.

Since lens mounting assembly 21 cooperates with cover 74 to keep ambient light out of station 20, labyrinth-like light seals (not shown) are formed between frame 171 and block 175.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention.

What is claimed is:

1. An optical motion picture film printer having a projector station, a camera station, drive motor means for transporting film at the stations, and means for projecting light from the projector station to the camera station, in which the improvement comprises, for at least one of the stations:

a plurality of interchangeable film transport units for handling different film formats, each film transport unit including an input gear, drive sprocket means driven by the input gear, and incremental film advance means driven by the input gear for handling the corresponding film format, thereby transporting film past an aperture through which the light passes as the input gear rotates; and means for individually and removably receiving any one of the film transport units at the station to couple the drive motor means to the drive sprocket means and the incremental film advance means of the received film transport unit so as to transport the film handled thereby, the receiving means having means for removably securing the received film transport unit at the station and an output gear that rotates responsive to the drive motor means, is engageable with the input gear of the received film transport unit when such unit is secured by the securing means, and is free to move out of engagement with the input gear of the received film transport unit as such unit is removed from the receiving means;

the drive sprocket means and incremental film advance means of each unit transporting the same number of frames past the aperture per revolution of the output gear.

2. The film printer of claim 1, in which the securing means comprises a carriage movable on the chassis in the direction of the light projecting path to vary the distance between the film transport units at the stations.

3. The film printer of claim 2, in which the output gear is wider than the input gear to maintain engagement of the input and output gears as the carriage moves in the direction of the light projection path.

4. The film printer of claim 1, in which the securing means comprises one or more quick disconnect fasteners.

5. The film printer of claim 1, in which the receiving means are located at both stations and the plurality of film transport units comprise a plurality of interchangeable projector film transport units for handling different film formats and a plurality of interchangeable camera film transport units for handling different film formats.

6. The film printer of claim 5, additionally comprising first and second indexing means for establishing the position of the respective projector and camera film transport units on the chassis when secured by the corresponding securing means.

7. The film printer of claim 6, in which the first and second indexing means are different, to prevent securing one of the film transport by the wrong securing means.

8. The printer of claim 5, additionally comprising mode selection means, a power transmission system responsive to the mode selection means to rotate the output members either individually or concurrently responsive to the drive motor means.

9. The film printer of claim 8, in which the power transmission system additionally comprises means for stopping the output members at a reference position after each period of individual rotation of the output members.

10. The film printer of claim 5, additionally comprising mode selection means, a power transmission system responsive to the mode selection means to either individually rotate the output members in either direction or to rotate the output members concurrently in the same or opposite directions.

11. The film printer of claim 10, in which the power transmission system additionally comprises means for stopping the output members at a reference position after each period of individual rotation of the output members.

12. The film printer of claim 10, in which the power transmission system additionally comprises means for stopping the output means at the reference position after each period of concurrent rotation of the output members.

13. The film printer of claim 1, in which the drive motor means is adjustable so as to vary the angular velocity of the output gear.

14. The film printer of claim 1, in which the drive motor means is a linear velocity motor.

15. The film printer of claim 1, additionally comprising an enclosed chassis having a top panel, a pair of master film storage reels mounted on the top panel for transport of master film at the projector station in a path lying in a plane spaced directly above the top panel, a pair of raw film storage reels mounted on the top panel for transport of raw film at the camera station in a path lying in a plane directly above the top panel, the drive motor means being housed in the chassis, and a hub corresponding to each reel mounted on the top panel and extending through the top panel from the drive motor means to the corresponding reel.

16. The printer of claim 15, in which the top panel is horizontal and the plane of the master film path and the raw film path is horizontal.

17. The printer of claim 15, in which the master film reels and the raw film reels lie within the confines of the area of the top panel.

18. The printer of claim 15, in which the reel drive motor means comprise a plurality of constant torque reel drive motors, one such reel drive motor lying directly under each reel mounted on the top panel.

* * * * *